United States Patent [19]
Ferdinand et al.

[11] Patent Number: 5,726,744
[45] Date of Patent: Mar. 10, 1998

[54] ROSETTE-TYPE OPTICAL MICROSYSTEM OF STRAIN GAUGES HAVING DIELECTRIC GUIDES FOR MEASURING A LONGITUDINAL STRAIN IN A PLANAR STRUCTURE

[75] Inventors: Pierre Ferdinand, Houilles; Sylvain Magne, Chatillon; Stéphane Rougeault, Sceaux, all of France

[73] Assignee: Commissariat a l'Energie Atomique, Paris, France

[21] Appl. No.: 550,029

[22] Filed: Oct. 30, 1995

[30] Foreign Application Priority Data

Nov. 18, 1994 [FR] France ................... 94 13845

[51] Int. Cl.⁶ ........................................ G01B 11/16
[52] U.S. Cl. ............... 356/32; 250/227.14; 250/227.16; 385/12; 385/13
[58] Field of Search ................. 356/32; 385/12, 385/13, 14, 28, 95, 96; 250/227.16, 227.14; 73/800; 350/960.14, 94.4

[56] References Cited

U.S. PATENT DOCUMENTS 4,806,012  2/1989  Meltz et al. ..................... 356/32
5,321,257  6/1994  Danisch ........................... 250/227
5,361,130  11/1994  Kersey et al. .................... 356/345

OTHER PUBLICATIONS

Electronics Letters, vol. 29, No. 11, May 27, 1993, GB, pp. 964–966, A.D. Kersey et al. "Multi–Element Bragg–Grating Based Fibre–Laser Strain Sensor".

Smart Materials & Structures, vol. 1, No. 3, Sep. 1992, Bristol, GB, pp. 227–232, T. Valis et al., "Fiber-Optic Fabry-Perot Strain Rosettes".

*Primary Examiner*—Frank G. Font
*Assistant Examiner*—Michael P. Stafira
*Attorney, Agent, or Firm*—Pearne, Gordon, McCoy & Granger LLP

[57] ABSTRACT

The present invention relates to a planar, rosette-type, optical microsystem with strain gauges having dielectric guides used for measuring a system of strains or stresses applied to a part, in which the part is under purely longitudinal strain, at least one rosette being formed by at least two strain gauges with dielectric guides (J1, J2, J3) and in which a calculating circuit makes it possible to determine said strain by resolving a system of equations.

19 Claims, 7 Drawing Sheets

ROSETTE-TYPE OPTICAL MICROSYSTEM OF STRAIN GAUGES HAVING DIELECTRIC GUIDES FOR MEASURING A LONGITUDINAL STRAIN IN A PLANAR STRUCTURE

TECHNICAL FIELD

The present invention relates to a rosette-type, optical microsystem of strain gauges with dielectric guides for measuring a longitudinal stress or strain. Throughout the remainder of the description, the term longitudinal stress or strain will be used for designating a stress or strain only having a single component.

PRIOR ART

At present, elongation measurements are made by gauges or rosettes (i.e. a structure assembled from several gauges) with metal tracks or constituted by semiconductors, as shown in FIG. 2A.

A gauge measures a component having a known orientation, whereas a rosette makes it possible to determine the values of the main strains of the gauge plane, as well as the orientation of the main reference mark relative to the arrangement of the gauges constituting the rosette. Therefore these gauges or rosettes are electrical and temperature-compensated over a restricted range of use by a careful choice of materials.

Of late extensometric methods have appeared due to optoelectronic advances. These methods are based on optical and not electrical phenomena, namely polarimetric, mode coupling or interferometric sensors. These sensors, like most existing sensors, have a temperature sensitivity not compensated in an intrinsic manner. The solution normally recommended for such problems consists of comparing the response of a detector subject to a strain to be determined and therefore the induced deformation with the response of another reference detector, which is not subject to said strain. The behaviour of the sensor or transducer formed from these two detectors becomes independent of temperature fluctuations if the latter are sufficiently close to be effectively at the same temperature. In most cases, the two detectors are placed relatively far apart for mechanical construction reasons, so that this hypothesis is not always proved in an industrial environment.

An example of such a technical impossibility can e.g. be the measurement of a strain applied to a rib or spar of an aircraft wing made from a composite material. In such a case, knowing that the detectors are embedded in the composite, it is necessary to spatially isolate them in order that one measures a strain to which the other is not exposed. However, it is not possible to conceive a remote temperature positioning of a strain sensor with respect to its reference sensor, because the temperature differences become excessive.

At present, this increase sensitivity with respect to temperature and strains limits the industrial advances with respect to fibre optics sensors, particularly for measuring stresses and strains. A technical solution to this problem is therefore of vital importance in order to eliminate this blockage point and impose this new instrumentation field.

This problem of increased sensitivity has not been solved in a satisfactory manner (cf. in particular the recent article by E. J. Friebele and A. D. Kersey in Laser Focus World, May 1994, pp 165–171). Certain alternative solutions have been patented and consist of compensating the temperature expansion of the detector (patent WO 91/10151 of W. W. Morey and W. L. Glomb). The principle amounts to incorporating the sensitive fibre between two parts made from different materials and therefore having different thermal expansion coefficients. These authors then show that it is possible to find a geometrical constitution or structure for which the resulting expansion applied to the measurement fibre is zero. The problem is that this system has a complex mechanical construction and requires a good definition of the dimensions and the expansion coefficients of the materials used, so that in practice there is still a temperature fluctuation due to manufacturing tolerances.

Other ideas have appeared, such as the use of two polarization modes propagating in the fibre (both subject to different strain and temperature responses) or the use of two detectors with different spectral responses (article by E. J. Friebele and A. D. Kersey).

The limitation is due to the fact that the detectors have very close strain and temperature responses, because there is little difference in the materials used. Therefore a highly resolved distinction is difficult. Moreover, the first solution makes it necessary to maintain the polarization of the light (polarization maintaining fibre), which greatly complicates the implementation of such a measuring device (complex connections) and consequently increases its costs.

The object of the invention is to propose a device making it possible to obtain freedom in mathematical manner from temperature fluctuations, via a processing procedure of informations collected from a sensor incorporating detectors positioned sufficiently close to one another to be at the same temperature.

DESCRIPTION OF THE INVENTION

The present invention relates to a rosette-type, optical microsystem of strain gauges having dielectric guides for measuring a system of strains applied to a part, characterized in that as the part is exposed to a strain only having a single component, said microsystem comprises at least one rosette formed from at least two strain gauges having dielectric guides and in that a calculating circuit makes it possible to determine said strain, independently of the temperature, by the resolution of a system of equations.

Thus, according to the invention, a rosette of strain gauges having dielectric guides and in particular optical fibres and of known principle, which is normally used for measuring the system of strains, with an a priori unknown orientation, applied to a part at a single point is used in a surprising manner in the case of a part exposed to a strain only having a single component. The resolution of a system of equations by a calculating or computing circuit makes it possible to determine the strain, independently of the temperature, if the rosette is formed from two optical fibre gauges independent of the temperature and positioning angle of the rosette on the part if it is formed from three gauges. This principle applies for all gauges measuring an optical path variation under strain or stress, particularly photo-inscribed Bragg networks or systems.

Advantageously, the rosette is formed from three Bragg networks placed at 120° or 45° from one another. These three networks can be simultaneously or successively inscribed by the same optical irradiating beam. These three networks need not be simultaneously inscribed and can have different characteristic wavelengths.

The system of equations used in the invention is as follows:

$$\begin{cases} \lambda_1 - \lambda_1{}^0 = \xi_1 \cdot [d + r \cdot \cos(2 \cdot \alpha)] + \xi_2 \cdot (T - T_0) \\ \lambda_2 - \lambda_2{}^0 = \xi_1 \cdot [d + r \cdot \cos(2 \cdot \alpha - 2 \cdot \beta_2)] + \xi_2 \cdot (T - T_0) \\ \lambda_3 - \lambda_3{}^0 = \xi_1 \cdot [d + r \cdot \cos(2 \cdot \alpha + 2 \cdot \beta_1)] + \xi_2 \cdot (T - T_0) \end{cases}$$

$\lambda_1$, $\lambda_2$ and $\lambda_3$ being respective characteristic wavelengths of three Bragg networks constituting the rosette, said wavelengths being very close to one another and $\lambda_1{}^o$, $\lambda_2{}^o$ and $\lambda_3{}^o$ are the characteristic wavelengths in the absence of deformations and at a reference temperature $T_o$, $\xi_1$ being a coefficient linking the characteristic wavelength with the deformation and $\xi_2$ a thermal expansion coefficient, the two angles $\beta_1$ and $\beta_2$ being of a random, but known nature and non-zero modulo $\pi$, characterizing the rosette and $\alpha$ being the angle formed by the orientation of the main strain to be determined with the orientation of the rosette reference strain gauge, the parameters d and r being respectively the half-sum and the half-difference of the main deformations to be determined.

Advantageously the dielectric guides are optical fibres.

This optical microsystem comprises at least one polarization maintaining or non-maintaining, dielectric guide, in which are incorporated the strain gauges, which are elongation transducers arranged in accordance with known, non-parallel orientations. The elongation transducers, which are themselves dielectric guides, can be bonded on the surface, or embedded within a locally planar, support material, whose deformations are to be determined.

In an embodiment these transducers are Bragg networks functioning by phase tuning effect and the guides are mono-mode and photosensitive (e.g. germanosilicate matrix or matrix doped by rare earth ions ($Ce^{3+}$, . . . )).

In another embodiment the transducers function by the interferometric effect (Fabry-Perot, Michelson or Mach-Zehnder interferometers) and the guides are monomode.

In another embodiment, each gauge measures an optical path variation, which is a function of the strain to be measured and which induces a spectral displacement (Bragg network).

In another embodiment each gauge measures a variation of the optical path, which is a function of the strain to be measured and which induces a displacement of the interference fringes (Fabry-Perot, Michelson, Mach-Zehnder interferometers).

The optical microsystem according to the invention can be such that the gauges constituting the rosette are positioned in series on the same dielectric guide.

The microsystem can also have a configuration of the balanced Sagnac interferometer type exploiting a 50% reflection coupler in the spectral band of use, said configuration being constituted by a single guide plane and permitting the inclusion of a rosette between two planes of a material.

Thus, the present microsystem makes it possible to supply an optical signal permitting the measurement of a pure longitudinal strain or stress (tension, compression) independently of the temperature and positioning of the optical microsystem on the support material, whose stresses or strains are to be determined. The longitudinal strain sensor formed in this way is consequently perfectly adapted to an industrial environment (construction site, etc.), because there is no longer any need to carry out a temperature correction and it can be placed randomly in any position on a planar portion of the part to be monitored (beam, mast, panel, etc.). A particularly interesting application consists of inserting the sensitive fibre within a composite material. The fibre can advantageously be substituted for several typically carbon, reinforcing fibres and maintains the alignment of the latter. The fibres forming the rosette are placed within parallel planes with different orientations. Such a rosette can be inserted in a rib or spar of an aircraft wing made from a composite material and the longitudinal strain information can be obtained no matter what the known, non-parallel orientation of the two or three gauges forming said rosette.

The strain information can be optically transformed in various ways, because the microsystem can use different physical detection principles (interferometry, phase tuning), provided that these principles involve the dielectric guide as the intrinsic sensor, said guide having an effective guidance index and interaction length which are both dependent on the temperature, as well as strains.

DETAILED DESCRIPTION OF EMBODIMENTS

To permit a better description of the device or means according to the invention, firstly some details will be given on photo-induced Bragg networks or systems.

The principle of Bragg networks functioning as strain gauges consists of using the dependence of the transmission or reflection spectrum of such a transducer exposed to a locals train (tension or compression) oriented in accordance with the axis of a fibre. The network only transmits the strain oriented in accordance with the local axis of the fibre.

As shown in FIG. 1, the Bragg network filters the light in reflection, the incident and reflected waves remaining guided. The reflection-filtered wavelength is that corresponding to the phase tuning (Bragg condition):

$$\lambda_r = 2.N. ^\wedge \qquad (1)$$

$\lambda_r$ being the reflected wavelength, N the effective index of the guided mode (e.g. fundamental: $LP_{01}$) and $^\wedge$ the space period of the photo-inscribed network.

Figure 1A:
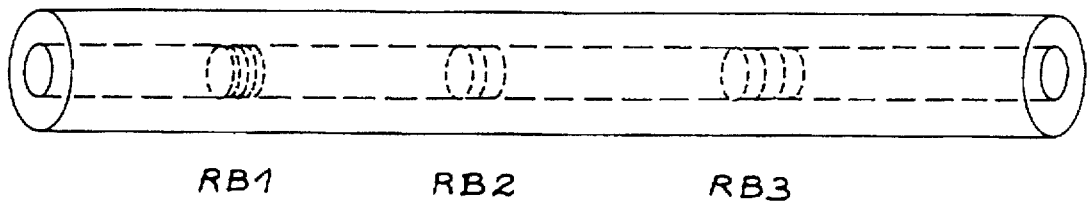
FIGS. 1A, 1B, 1C and 1D illustrate the filtering behaviour of phot-inscribed Bragg networks.
Figure 1B:
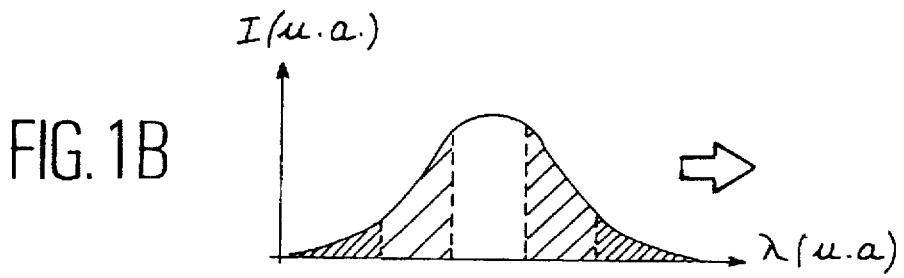
Figure 1C:
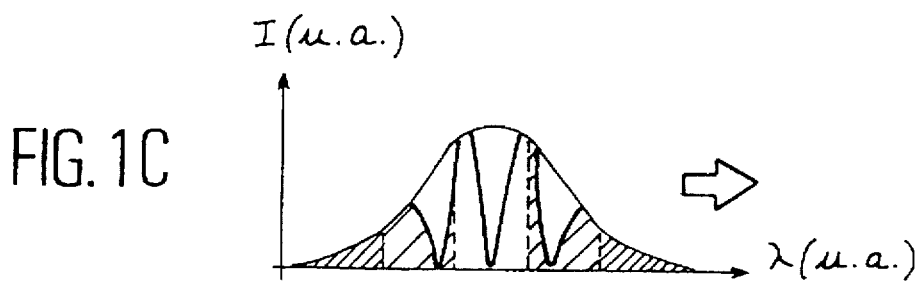
Figure 1D:
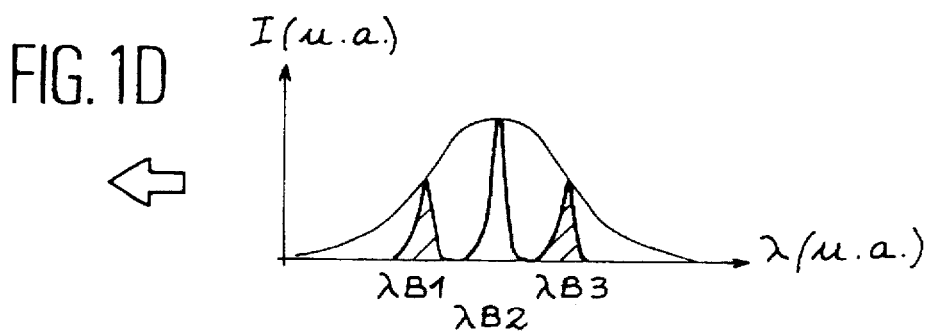

Thus, FIGS. 1B to 1D illustrate the filtering behaviour of the three photo-inscribed Bragg networks RB1, RB2 and RB3 shown in FIG. 1A. FIGS. 1B, 1C and 1D are curves of the intensity as a function of the wavelength, respectively of the incident spectrum, the transmitted spectrum and the reflected spectrum.

The optical fibres are usually monomode, so that all the energy propagating in a single mode is virtually integrally reflected at the tuning wavelength (reflection exceeding 95%). In the case where the fibre is multimode, the wavelength tuning is different for each mode.

These fibres usually have a silica core codoped with germanium oxide, but a description has also been given of codoping with alumina or oxides of rare earths (cerium). The diffusion of hydrogen or deuterium into the core also makes it possible to increase the photosensitivity of silica fibres. Other glasses, such as fluorine glasses, codoped with oxides of rare earths also make it possible to obtain photo-inscribed Bragg networks.

Irradiation modifies the local refractive index in such a way that a spatially periodic irradiation creates the network, either by internal irradiation (standing waves within the guide) or by external irradiation (two-wave interference fringes). External irradiation makes it possible to inscribe a network of any random space period, whereas internal irradiation only makes it possible to inscribe a network of the same period as the irradiation wave half-length.

Inscription methods have been described by numerous patents and publications. The most widely used two-wave interferometry external inscription method is described in patent WO 86/01303 filed by W. H. Glenn, G. Meltz and E. Snitzer.

Optical transducers based on the use of Bragg networks offer numerous advantages. Thus, they are insensitive to electromagnetic disturbances allowing multiplexing (e.g. in wavelenght, in the case involved here), have millimetric dimensions (microsystem approach) and lead to measurement sensitivities and resolutions comparable with conventional methods such as semiconductor or metal wire resistive strain gauges.

Sensors utilizing the principle of the dependence of the tuning wavelength of the Bragg network as a function of the elongation of said network (as a result of a strain) are also dependent on the temperature, via the expansion coefficient of the matrix, which is usually silica, and the thermal sensitivity of its refractive index. In most real applications outside the laboratory, the temperature is not controlled and it is easily proved that the elongation due to the thermal expansion cannot be ignored with regard to the elongations induced by strain or stress which it is wished to measure.

The concept of the rosette is not new and rosettes have been used for some time for determining the values of two main strains of the plane, as well as the direction of the main reference mark, if the temperature T is known. The principle of a rosette of optical fibre strain gauges has been described in a recent publication by T. Valis, D. Hogg and R. M. Measures (Smart Mater. Struct., vol. 1, 1992, pp 227–232). This rosette uses either Fabry-Perot interferometers, or Michelson interferometers as strain gauges and as shown in FIGS. 2B and 2C.

Figure 2A:
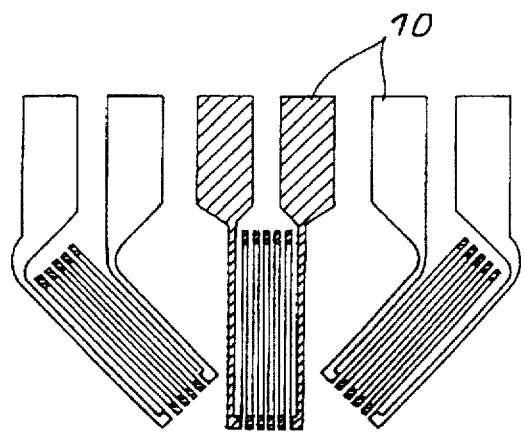
FIGS. 2A, 2B and 2C are examples of known strain gauge rosette types.
Figure 2B:
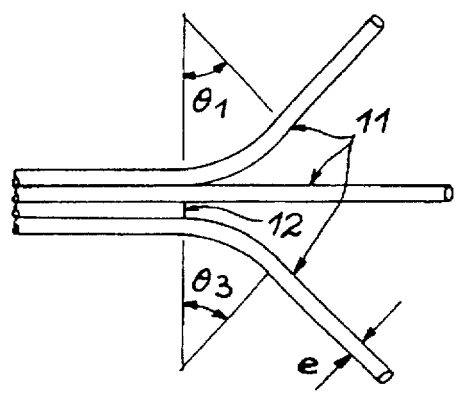
Figure 2C:
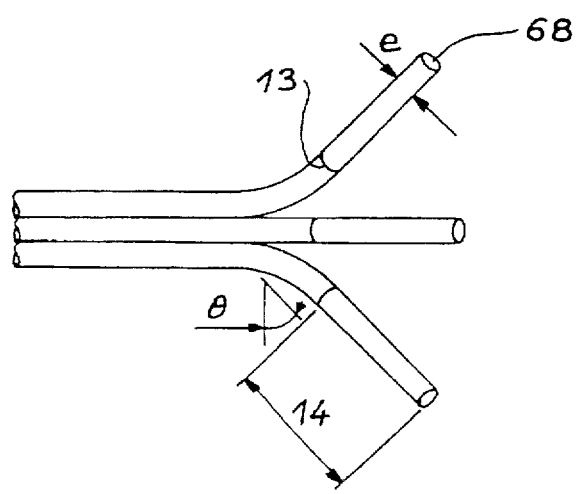

FIGS. 2A, 2B and 2C are examples of strain gauge rosettes permitting the measurement of the two main strains of the gauge plane, as well as the orientation of their main reference mark. FIG. 2A shows a conventional, electrical rosette with metal tracks 10. FIG. 2B shows an optical rosette with Michelson interferometers with measuring arms 11 and a reference arm 12. FIG. 2C shows an optical rosette with Fabry-Perot interferometers (cavity formed by a dielectric layer 68 placed at the end of the fibre and a semi-reflecting weld 13). In the latter drawings the width e is 125 μm and the length 14 is the sensitive length.

These rosettes have been used in a conventional way, i.e. for finding the orientation of the main reference mark of the strains, as well as the values of the two main strains of the plane, the temperature of the measuring fibres being assumed as known, which is not the case in practice.

The originality of the invention is based on the use of this geometry for the punctiform measurement of only a single strain or stress, but independently of the temperature and positioning of the rosette in its plane. It is original in the sense that it strictly provides freedom from the effects of the temperature, so as to only measure those due to the tensile/compressive stresses to be determined, which offers better performance results than the previously described concepts, provided that the strain is purely longitudinal in the case of a simple rosette.

The advantage is that the information can be found again no matter what the positioning of the rosette on the surface or within the support material and, by performing the measurement in punctiform manner, there is no longer a need for a second reference fibre to obtain freedom from the temperature. Thus, this solution solves the problem of increased sensitivity to strains and temperature in the case of a longitudinal strain (rib, spar, mast, beam, etc.) and solves the problem of finding a temperature-reliable reference.

Although this microsystem concept is demonstrated here with reference to optical fibres (first integration level), it can be implemented in integrated optics (second integration degree).

The invention consists of measuring the characteristic wavelength differences of two or three networks. A priori, these networks can be placed with any orientation, but not parallel to one another.

If the rosette is only constituted by two networks, it is possible to deduce therefrom the longitudinal strain exerted, independently of the temperature, the positioning angle of said rosette with respect to the orientation of said strain being assumed as known.

However, if the rosette is constituted by three networks, it is possible to deduce therefrom the longitudinal strain exerted, independently of the temperature and positioning (i.e. the angle formed by the rosette orientation with respect to the direction of the strain to be determined).

In practice, these three networks forming the rosette are generally placed precisely at 120° or 45° from one another, so as to facilitate the analysis of the results by the use of simpler mathematical formulas.

Figure 3A:
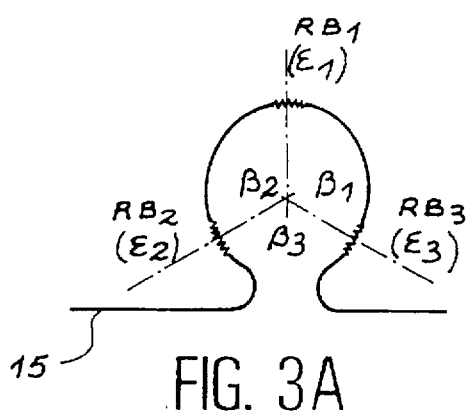
FIGS. 3A, 3B and 3C are examples of rosette configurations with three Bragg networks according to the invention.
Figure 3B:
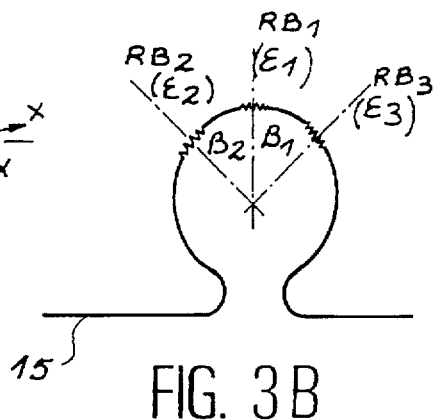
Figure 3C:
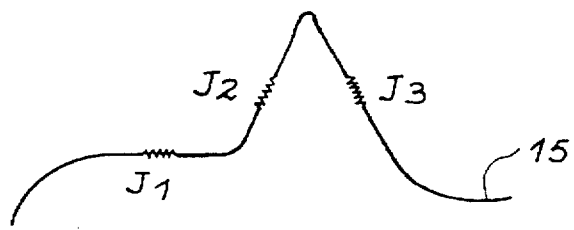

FIGS. 3A, 3B and 3C are examples of configurations of rosettes having three Bragg networks $RB_1$, $RB_2$ and $RB_3$ respectively measuring the deformations $\xi_1$, $\xi_2$ and $\xi_3$ respectively for a rosette at 120°, a rosette at 45° and a rosette at 120° with Bragg networks, having three gauges J1, J2 and J3 and using a phot-inscribable, silica optical fibre 15.

However, for manufacturing tolerance reasons, the positioning angles will not always be close to these ideal values, so that the numerical resolution of a system of equations (3) of the rosette defined hereinafter will be applied.

From the standpoint of the spectral interrogation, several solutions can be envisaged and two are referred to hereinbefore in exemplified manner.

The three networks are simultaneously or successively inscribed by the same optical irradiating beam (they then have the same transfer function and the same characteristic wavelength). The measurement of the spectral maximum is no longer possible simply with said method, because there is an overlap of the characteristic spectra. In the latter case, a more complex interrogation method is required, namely a time-resolved interrogation, e.g. as described in U.S. Pat. No. 4,996,419 of W. W. Morey.

The three networks are not simultaneously inscribed and can therefore have different characteristic wavelengths. This solution is simpler to implement from the measurement and demultiplexing standpoints. In both cases, the networks must be inscribed in fibres having the same thermal expansion coefficients. This condition is obviously satisfied if the fibres are strictly identical coming from the same preform. Thus, on accepting as a hypothesis that the Bragg transducers forming the rosette are sufficiently close to one another to be at the same temperature, the measurement of the characteristic wavelength differences makes it possible to determine the tensile stress independently of the temperature. This approach will be studied in greater detail hereinafter.

$\lambda_1$, $\lambda_2$ and $\lambda_3$ are the respective characteristic wavelengths of the three Bragg networks constituting the rosette and $\lambda_1$, $\lambda_2$ and $\lambda_3$ the characteristic wavelengths in the absence of deformations and at a reference temperature $T_o$.

The variations of the wavelengths can be written, for all the networks (i=1, 2 and 3):

$$\frac{\Delta\lambda}{\lambda} \approx 0{,}78 \cdot \epsilon[\mu\epsilon] + 8{,}6 \cdot 10^{-6} \cdot \Delta T[K] - 5{,}2 \cdot 10^{-6} \cdot \Delta P[\text{MPa}] \quad (2)$$

$$\Delta\lambda_i = \lambda_i - \lambda_i^0 = \xi_1 \cdot \epsilon_i + \xi_2 \cdot (T - T_0) + \xi_3 \cdot (P - P_0)$$

in which $\xi_1$ is the coefficient linking the characteristic wavelength with the deformation and $\xi_2$ the thermal expansion coefficient. The coefficient $\xi_1$ (which is dependent on $\lambda$ can be accurately experimentally measured and is approximately 1 pm/µε (1 µε corresponding to a deformation of 1 µm/m) at the wavelength of 1300 nm for a germanosilicate monomode fibre. The coefficient $\xi_2$ is approximately 10 pm/K and the coefficient $\xi_3$ is generally ignored, being −5 pm/MPa.

For simplification purposes, the three wavelengths $\lambda_1$, $\lambda_2$ and $\lambda_3$ are considered as being very close to one another (to within an offset of a few nm).

This gives the following system of equations:

$$\begin{cases} \lambda_1 - \lambda_1^0 = \xi_1 \cdot [d + r \cdot \cos(2 \cdot \alpha)] + \xi_2 \cdot (T - T_0) \\ \lambda_2 - \lambda_2^0 = \xi_1 \cdot [d + r \cdot \cos(2 \cdot \alpha - 2 \cdot \beta_2)] + \xi_2 \cdot (T - T_0) \\ \lambda_3 - \lambda_3^0 = \xi_1 \cdot [d + r \cdot \cos(2 \cdot \alpha + 2 \cdot \beta_1)] + \xi_2 \cdot (T - T_0) \end{cases} \quad (3)$$

The two angles $\beta_1$ and $\beta_2$ characterizing the rosette can be of a random nature (but not zero modulo $\pi$) and $\alpha$ is the angle formed by the orientation of the main strain ($\sigma_x$) to be determined with the orientation of the reference strain gauge of the rosette (here gauge J1). A priori, the angle $\alpha$ is unknown and is a function of the positioning tolerances (position of the gauge-rosette on the support material surface).

The parameters d and r are respectively the half-sum and half-difference of the main deformations to be determined.

If the rosette is constructed with random angles $\beta_1$ and $\beta_2$, which are perfectly known after manufacture, it is possible to deduce therefrom the main, pure tensile stress by numerically resolving the system (3).

The deformation equations make it possible to formulate the tensile stress in accordance with the simple analytical form:

$$\sigma_x = \left( \frac{2 \cdot E}{1 + \nu} \right) \cdot |r(\lambda_1, \lambda_2, \lambda_3)| \quad (4)$$

in which E and ν are respectively the modulus of elasticity and Poisson's ratio of the host or support material (composite material, metal, concrete, etc.).

Reference is made to $f(T) = \xi_2 \cdot (T - T_o)$. If the rosette is constructed precisely in accordance with an angle of 120°, the expression of r is given by the following formula:

$$r(\lambda_1, \lambda_2, \lambda_3) = \frac{1}{3} \cdot \frac{[(\lambda_1 - \lambda_1^0 - f(T)) - (\lambda_2 - \lambda_2^0 - f(T))] + [(\lambda_3 - \lambda_3^0 - f(T)) - (\lambda_2 - \lambda_2^0 - f(T))]}{\xi_1 \cdot \cos(2 \cdot \alpha)}$$

i.e. finally, after simplication:

$$r = \frac{1}{3} \cdot \frac{[(\lambda_1 - \lambda_1^0) - (\lambda_2 - \lambda_2^0)] + [(\lambda_3 - \lambda_3^0) - (\lambda_2 - \lambda_2^0)]}{\xi_1 \cdot \cos(2 \cdot \alpha)} \quad (5)$$

and in the same way:

$$tg(2 \cdot \alpha) = \sqrt{3} \cdot \frac{[(\lambda_1 - \lambda_1^0 - f(T)) - (\lambda_3 - \lambda_3^0 - f(T))]}{[(\lambda_2 - \lambda_2^0 - f(T)) - (\lambda_1 - \lambda_1^0 - f(T))] + [(\lambda_2 - \lambda_2^0 - f(T)) - (\lambda_3 - \lambda_3^0 - f(T))]}$$

i.e., once the simplification has been carried out:

$$tg(2 \cdot \alpha) = \sqrt{3} \cdot \frac{[(\lambda_1 - \lambda_1^0) - (\lambda_3 - \lambda_3^0)]}{[(\lambda_2 - \lambda_2^0) - (\lambda_1 - \lambda_1^0)] + [(\lambda_2 - \lambda_2^0) - (\lambda_3 - \lambda_3^0)]} \quad (6)$$

It is pointed out that r and α are independent of T, because the two equations characterizing them are expressed as spectral differences (wavelength differences between the apices of the transfer functions of the Bragg networks taken in pairs). It is also pointed out that r and α are also independent of the pressure P which, like the temperature, is exerted in all directions in space. However, the two preceding equations (5) and (6) make it possible to formulate the stress directly from the measured wavelengths, because:

$$|r| = \frac{1}{3 \cdot \xi_1} \cdot |(\lambda_1 - \lambda_1^0) - (\lambda_3 - \lambda_3^0)| \cdot \sqrt{3 + (2 \cdot x - 1)^2}$$

with:

$$x = \frac{(\lambda_2 - \lambda_2^0) - (\lambda_3 - \lambda_3^0)}{(\lambda_1 - \lambda_1^0) - (\lambda_3 - \lambda_3^0)}$$

The pure tensile stress exerted on the material is consequently written, in the case of a rosette with three gauges precisely at 120°:

$$\sigma_x = \left( \frac{2 \cdot E}{1 + \nu} \right) \cdot \left| \frac{\Delta\lambda_{13} - \Delta\lambda_{13}^0}{3 \cdot \xi_1} \right| \cdot \sqrt{3 + \left[ 2 \cdot \left( \frac{\Delta\lambda_{23} - \Delta\lambda_{23}^0}{\Delta\lambda_{13} - \Delta\lambda_{13}^0} \right) + 1 \right]^2} \quad (7)$$

In the same way, for a rosette with three gauges precisely at 45°, we write:

$$\sigma_x = \qquad (8)$$

$$\left(\frac{E}{1+\nu}\right) \cdot \left|\frac{\Delta\lambda_{23}-\Delta\lambda_{23}^0}{\xi_1}\right| \cdot \sqrt{1+\left[2\cdot\left(\frac{\Delta\lambda_{31}-\Delta\lambda_{31}^0}{\Delta\lambda_{23}-\Delta\lambda_{23}^0}\right)+1\right]^2}$$

with $\Delta\lambda_{31}=\lambda_3-\lambda_1$ and $\Delta\lambda^0_{31}=\lambda_3^0-\lambda_1^0$ and so on, by circular permutations.

If the wavelengths $\lambda_1$, $\lambda_2$ and $\lambda_3$ are separated by more than a few nm (but still within the same spectral band a few dozen nanometers wide), the equations (7) and (8) must be rewritten substituting the term:

$$(\lambda_1-\lambda_1^o)-(\lambda_2-\lambda_2^o)=\Delta\lambda_{12}-\Delta\lambda_{12}^o$$

by the term:

$$(\lambda_1-\lambda_1^o)-(\lambda_2-\lambda_2^o)\cdot\lambda_1/\lambda_2$$

and in the same way:

$$(\lambda_1-\lambda_1^o)-(\lambda_3-\lambda_3^o)\cdot\lambda_1/\lambda_3$$

and:

$$(\lambda_2-\lambda_2^o)\cdot\lambda_1/\lambda_2-(\lambda_3-\lambda_3^o)\cdot\lambda_1/\lambda_3$$

the coefficient $\xi_1$ being defined at the wavelength $\lambda_1$.

The sensor can be optically interrogated continuously or in pulse-like manner, with the aid of a source which is spectrally wider or much narrower than the spectral width of the interrogated Bragg network.

Two concepts can be used:

Passive sensor: the measured optical signal corresponds to the reflection or transmission of a broad spectral band or narrow tunable spectrum interrogation signal.

Active sensor: the measured optical signal corresponds to the emission of the laser sensor interrogated by an optical pumping signal (at a different wavelength from the laser emission).

In both cases the optical detection method is the same. It consists of observing the reflection or transmission spectra (passive sensors) or reemission spectra (active sensors/lasers) in order to deduce therefrom the characteristic wavelengths.

Figure 4:
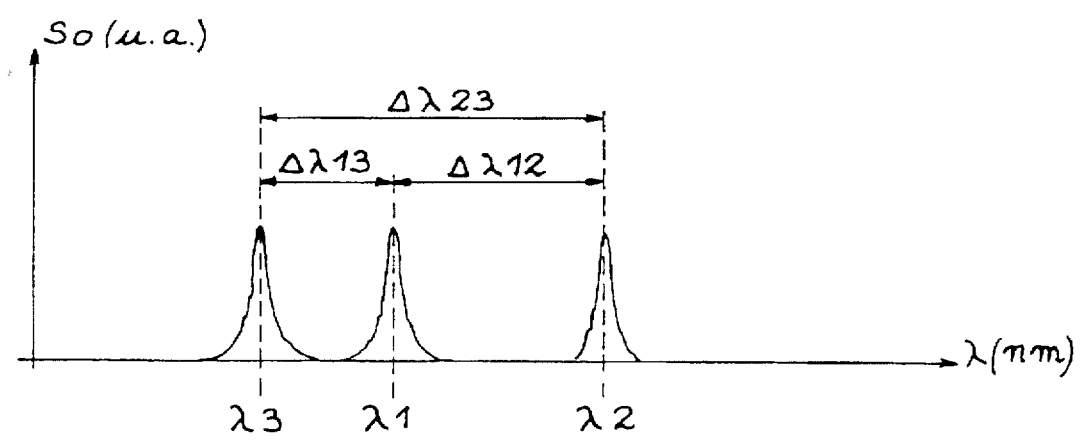
FIG. 4 illustrates the configuration of the optical spectra as a function of the wavelength.

FIG. 4 illustrates an optical spectrum curve SO as a function of the wavelength $\lambda$ which makes it possible to define the different characteristic wavelengths. The differential deformations between each network can be directly measured from the optical spectrum.

Figure 8A:
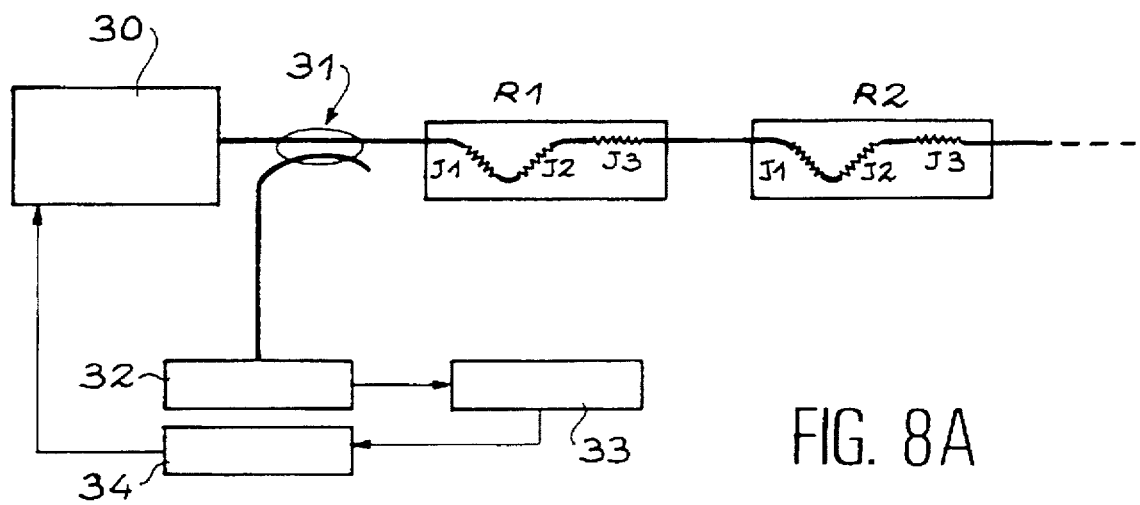
FIGS. 8A and 8B illustrate an array of sensors having Bragg rosettes.
Figure 8B:
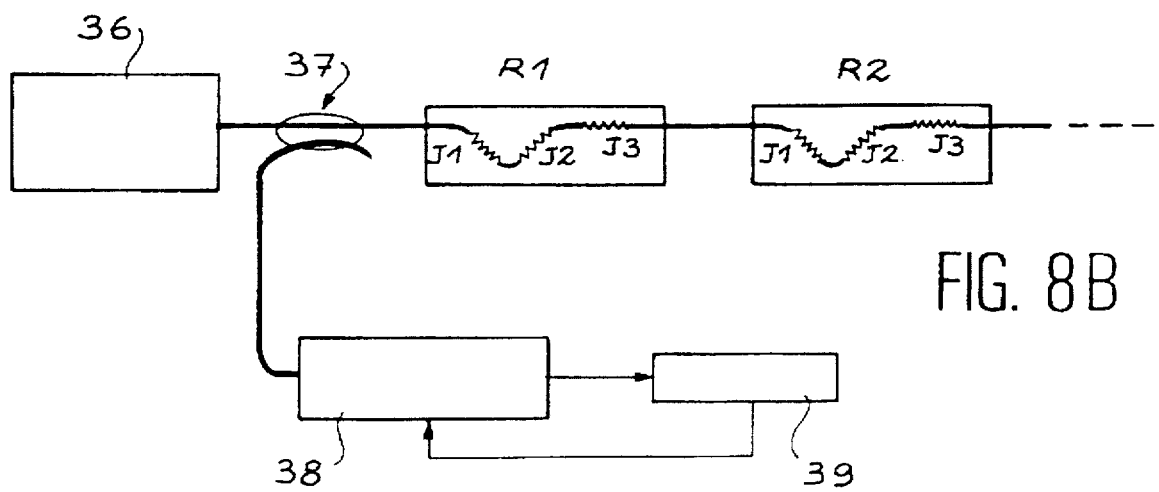

Two constitutions or structures can be envisaged as a function of whether the network interrogation process functions in reflection or transmission. Operation in reflection is illustrated by FIGS. 8A and 8B.

Conversely, it is possible to produce a loop (Sagnac interferometer) by means of an optical coupler, whose coupling rate is close to 50% reflection in the spectral band of interest. This balanced interferometer (50%) constitutes a "fibre mirror" according to an operation described by K. O. Hill et al in Electr. Lett., vol. 23, No. 9, 1987, pp 465/6. The Sagnac interferometer then makes it possible to reverse the operation of the rosette which, instead of operating in reflection operates in transmission, the coherence length of the filtered wave exceeding the spectral difference between the two extreme networks.

Figure 5A:
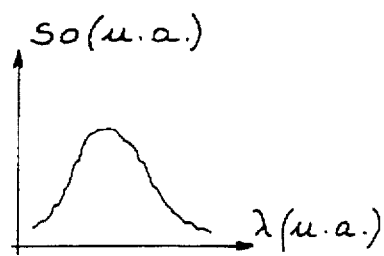
FIGS. 5A, 5B and 5C illustrate a Bragg rosette having a Sagnac interferometer.
Figure 5B:
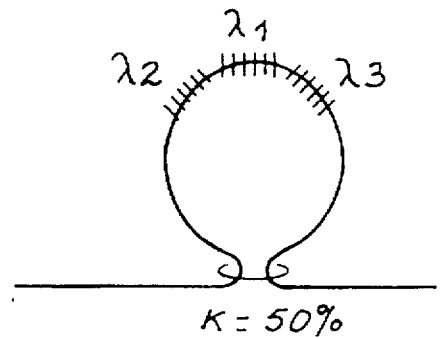
Figure 5C:
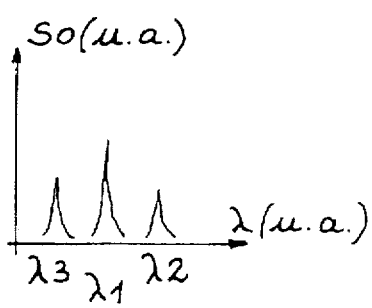

FIGS. 5A, 5B and 5C illustrate a Bragg rosette with a Sagnac interferometer, operating in transmission, with a wide spectrum, incident optical source shown in FIG. 5A, with a coupler shown in FIG. 5B and a spectrum of lines observed in transmission shown in FIG. 5G.

The second advantage of the Sagnac interferometer is that the fibre microsystem is constituted by a single fibre plane. It would then appear possible to embed the rosette between two layers of e.g. a composite material.

From a practical standpoint, the measurement method can make use of an "all-optical" solution (including a transmission filter or interferometer supplying a transmission proportional to the measured wavelength) or an optical and electronic solution (using an acquisition by sampling and processing of data by a special dedicated processor).

The advantage of using networks having the same characteristics is that with the radiation having to be the same for all the networks, there is no need to modify the settings of the inscription means. However, it is easier to distinguish the transfer functions of the fibres when the latter are well separated (the optical signals not overlapping) and it would therefore seem to be preferable to have different irradiations in order to create different characteristic wavelengths.

The fibres used may or may not be of the polarization maintaining type. In the absence of polarization maintenance, the strain birefringences induce a poorly defined polarization state and a less precise strain measurement than when the fibres have polarization maintenance, as has been pointed out by T. Valid et al.

Several practical embodiments will now be considered. The construction of the rosette is in two parts, namely the inscription part of the Bragg networks and the incorporation part onto or into a support material.

Inscription of the constituent networks of the rosette

The Bragg network inscription methods are described in numerous patents and publications (two-wave interferometry methods), masking by planar network, passage of the fibre beneath a slit, etc.) and in particular in patent WO 86/01303 by W. H. Glenn, G. Meltz and E. Snitzer.

A large number of publications describe the inscription technology, more particularly:

G. Meltz et al., Opt. Lett., vol. 14, No. 15, 1989, pp 823–825,

K. O. Hill et al., Appl. Phys. Lett., vol. 62, No. 10, 1993, pp 1035–1037,

K. O. Hill et al., Electr. Lett., vol. 27, No. 17, 1991, pp 1548–1551,

G. Meltz et al., SPIE 1516, 1991, pp 185–199,

S. Legoubin et al., JNOG 92, pp 175–177,

M. M. Broer et al., Opt. Lett., vol. 16, No. 18, 1991, pp 1391–1393.

The covering is removed from the fibre which is to be irradiated and in the case where it is made from epoxyacrylate this takes place by immersing e.g. in dichloromethane. This is followed by three irradiations at different space periods, thus forming three networks. It is possible to use all the irradiation methods described hereinbefore, but the most appropriate in this case would appear to be the right-angled prism method, because it is simpler from the instrumentation standpoint. Thus, with this method it is only necessary to control or check a single angle of incidence, namely that of the irradiating beam on the hypotenuse face of the prism.

Figure 6:
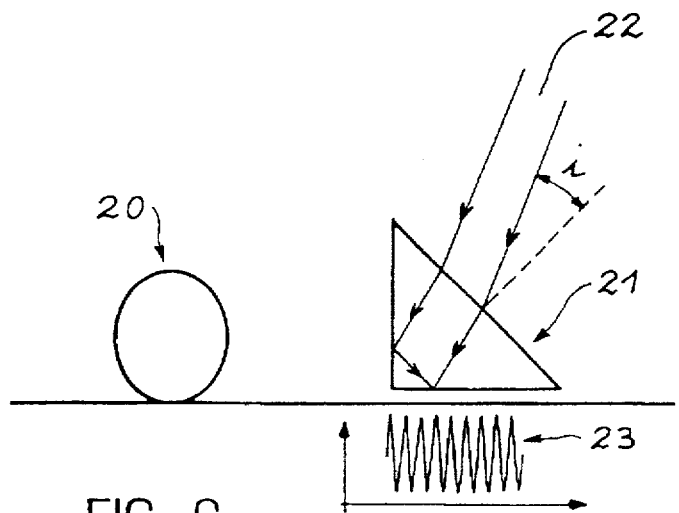
FIG. 6 illustrates an interferometric arrangement for the inscription of photo-inscribed Bragg networks using the so-called prism method.

FIG. 6 illustrates an interferometric arrangement for inscribing photo-inscribed Bragg networks using the prism method, with a photosensitive fibre 20, a right-angled prism 21 which is encountered by an ultraviolet irradiating beam with a limited divergence 22 and with a representation of the interference fringes 23.

The incidence angle on the face of the prism is linked with the reflection wavelength of the network by the following relation:

$$i = \arcsin\left(n_p \cdot \sin\left(\frac{\pi}{4} - \arcsin\left[\frac{N \cdot \lambda_{UV}}{n_p \cdot \lambda_B}\right]\right)\right) \quad (9)$$

in which $n_p$ is the index of the prism at the irradiation wavelength ($\lambda_{UV}$) and N is the effective index of the guided mode at the Bragg wavelength ($\lambda_B$) already defined in the relation (1).

Thus, either by splitting the irradiation beam into three beams in accordance with three prisms oriented in accordance with slightly different angular incidences, or by successively add accurately turning (rotating plate) the same prism by an appropriate angle, the three Bragg networks having slight characteristic wavelength differences of e.g. a few nm are irradiated, simultaneously in the case of the first process and sequentially in the second.

The irradiated space zone is large (a few mm long and 100 μm wide), so that the positioning constraints of the fibre on the irradiating support are not limitative.

The size of the rosette is a function of the radius of curvature of the fibres. A 2 cm wide, 5 cm long rosette can easily be obtained and it would appear possible to obtain a smaller rosette (6×9 mm²) according to the publication of H. W. Haslasch and J. S. Sirkis (Appl. Opt., vol. 30, No. 28, 1991, pp 4069-4080).

Incorporation of the support

Following irradiations, it must be possible to manipulate the rosette without any risk of deterioration, whilst maintaining the precise irradiation orientations. The fibres are then bonded to a flexible support. It is also possible to immerse the prepositioned rosette in a polymerizing liquid in order to solidify the arrangement and make it manipulatable in an industrial situation.

Figure 7:
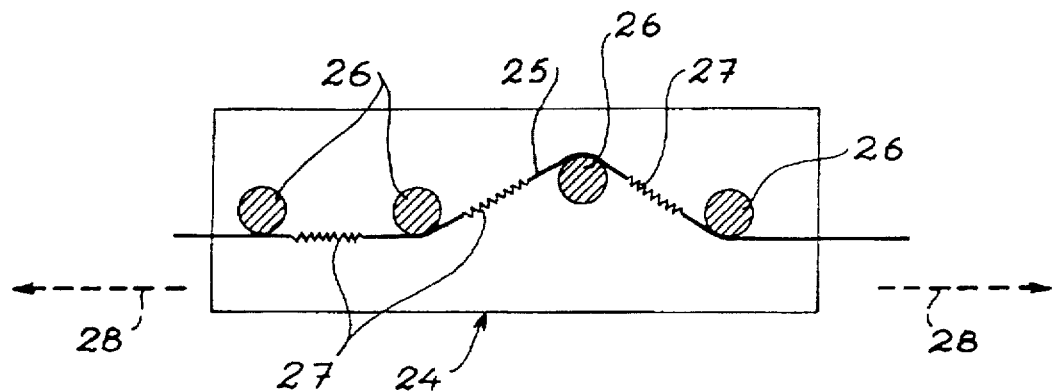
FIG. 7 illustrates an example of a three-gauge, rosette support.

FIG. 7 illustrates an example of a three gauge rosette support for the positioning of the fibre to be irradiated with a flexible support 24, a silica optical fibre 25, positioning supports 26, photo-inscribed Bragg networks 27 and with maintaining in tension 28.

The rosette can be interrogated in different ways, namely time, frequency or coherence interrogation. However, these solutions are not much used in practice due to the complexity of the detection electronics and the solution consists rather of using optical wavelength multiplexing.

The principle of optical multiplexing has already been described in numerous patents and publications particular reference being made to WO 86/01286 filed by G. Meltz, W. H. Glenn and E. Snitzer or U.S. Pat. No. 5,191,458 filed by D. R. Lyons and S. M. Reich.

The wavelength interrogation principle has already been described, namely the sensor is either passive, when it is merely necessary to return an optical signal with a narrow spectrum in reflection, or active and it then re-emits its own radiation after having been stimulated by an optical interrogation beam.

The latter case of an active sensor corresponds to a laser sensor concept in which the stresses modify the feedback condition (usually spectrally) of a fibre laser. Such a device is described in various publications, including the recent publication by S. Melle et al. (IEEE Phot. Tech. Lett., vol. 5, 1993, pp 263-266).

In the case of a passive sensor, either a wide spectral source (superluminescent diode) or a tunable laser with a spectral width less than that of the network is used as an optical interrogation beam. Rapid detection usually makes use of a tunable Fabry-Perot interferometer, but other solutions can also be used (Mach-Zehnder interferometer, etc.).

Two examples of optical multiplexing circuits are illustrated in FIGS. 8A and 8B, which describe a reflection-interrogated, Bragg rosette sensor network and the processing of the associated signal, respectively for an interrogation wavelength modulation (FIG. 8A) and for a reading wavelength modulation or scanning (FIG. 8B).

FIG. 8A shows a wavelength-modulatable optical source 30, connected to a fibre optics coupler 31, whereof one branch is connected to a photodetector 32, followed by an acquisition module 33 and a modulator 34, which is itself connected to the source 31. Each rosette is constituted by three gauges J1, J2 and J3.

In FIG. 8B a wide spectral band optical source 36 is connected to a fibre optics coupler 37, whose second branch is connected to a tunable Fabry-Perot interferometer 38 and to an acquisition module 39. It is also possible to see the rosettes R1 and R2 and the gauges J1, J2 and J3.

The way in which the Bragg networks are connected in series here to the measuring line is only given for information. For each gauge any topology can be used.

These demultiplexing procedures can also be extended to servocontrol methods making it possible to "follow" in real time the spectral displacements of the Bragg networks and as shown by A. D. Kersey, T. A. Berkoff and W. W. Morey (Opt. Lett., vol. 18, No. 16, 1993, pp 1370-1372).

The circuit has the same number of rosettes as measuring points. FIGS. 8A and 8B show two rosettes in exemplified manner.

The rosette defined in the invention can exploit a physical phase tuning phenomenon (Bragg networks) but also two-wave interferometry (Michelson and Mach-Zehnder) and multiple wave interferometry (Fabry-Perot).

After describing the construction of a Bragg network rosette and the processing of the associated signal, a description will now be given of an interferometric rosette.

A description has already been given of the problem of the increased sensitivity to temperature and strains and it has been demonstrated that in the case of Bragg networks it is possible to eliminate the effect due to the temperature so as to only measure the effect due to the main, sought longitudinal strain, this taking place independently of the position of the rosette in its plane if the latter is constituted by three gauges.

The rosettes formed by interferometric sensors are exposed to the same problems of increased sensitivity to strains and temperature. Thus, the optical rosette means according to the invention can use Bragg networks or interferometers.

Hereinafter a description will be given of the behaviour of interferometric transducers, their practical embodiments and the processing of the signal associated therewith.

Behaviour of interferometric elongation transducers

Unlike in Bragg networks, where the information is translated by a wavelength, the interferometric transducers supply an information in the form of an optical phase shift. The function of the interferometer is then to transform this phase variation into an intensity variation and it is the intensity variation which is effectively observed in order to deduce therefrom the phase variation, the intensity phase conversion law being known and dependent on the interferometer type.

Thus, this type of optical rosette requires the use of an optical source with a coherence length exceeding the optical path difference characteristic of the interferometer and typically a few nm to a few cm. The most widely used optical sources are laser diodes due to their adequate time coherence and their integratability, which is compatible with fibre optics sensor applications.

The general law linking the induced phase shift with the physical parameters to be measured (pressure, temperature and strains) is expressed in the form:

$$\Delta\emptyset/L = x_T \cdot dT + x_\epsilon \cdot d\epsilon + x_P \cdot dP \qquad (10)$$

in which L is the length difference between the reference arm and measuring arm for Mach-Zehnder and Michelson interferometers or the resonant cavity length in the case of the Fabry-Perot interferometer. This length corresponds to the geometrical path unbalance.

For a silica monomode fibre at a wavelength of 850 nm, the experimental coefficients have the following mean information values:

$$X_T \approx 100 \text{ Rad/m.K}$$

$$X_\epsilon \approx 10^4 \text{ Rad/m.} \epsilon$$

$$X_P \approx -5.10^5 \text{ Rad/m. Pa}$$

(the relative elongation being written:

$$\epsilon = \Delta l/l$$

in which $\Delta l$ is the elongation and $l$ the initial length, $l\epsilon$ corresponding to 100% relative elongation).

As a function of the interferometer type, the rosettes are differently designed and the resulting intensity law is specific.

Once the phase shifts $\Delta\emptyset_1$, $\Delta\emptyset_2$ and $\Delta\emptyset_3$ of the gauges respectively 1, 2 and 3 have been measured, the strain is obtained by applying once again the formula (4) substituting the term $\Delta\emptyset_i - \Delta\emptyset_i^o$ for the term $\Delta\lambda_i = \lambda_i - \lambda_i^o$ and $\lambda_\epsilon \cdot L$ for the term $\xi_1$ in the formulas (3), (5), (6), (7) and (8).

Mach-Zehnder interferometer rosette

A rosette of this type is described in the publication by J. S. Sirkis and C. E. Taylor, Exp. Mech., 1988, pp 170–176 and J. S. Sirkis and H. W. Haslach, J. of Light, Tec., vol. 8, No. 10, 1990, pp 1497–1503. Its description is illustrated by FIG. 9A and its design and acquisition electronics are described in the above publications.

This rosette is designed to solely determine a longitudinal strain. The principle consists of choosing a geometrical configuration like that shown in FIG. 9A, so that the optical path difference is proportional to the strain applied along the axis X of the drawing. The two beams emerging from the two measuring and reference fibres are projected onto a screen in the manner shown in FIG. 9B, so as to analyze the interference pattern (principle of Young slits, the cores of the two fibres serving as slits).

Figure 9A:
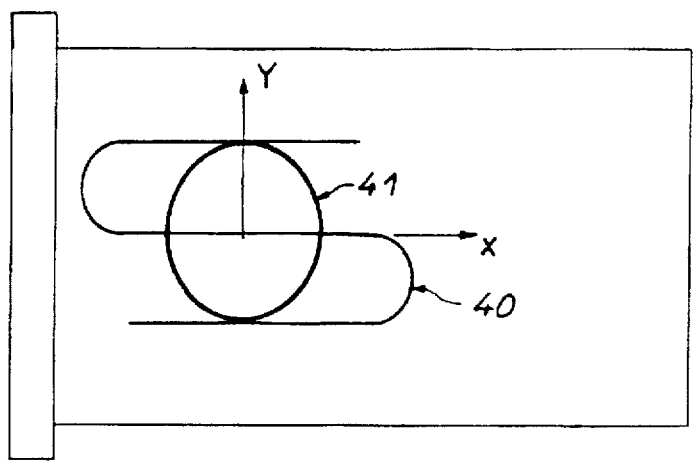
FIG. 9A illustrates a Mach-Zehnder interferometric gauge for measuring a longitudinal strain.
Figure 9B:
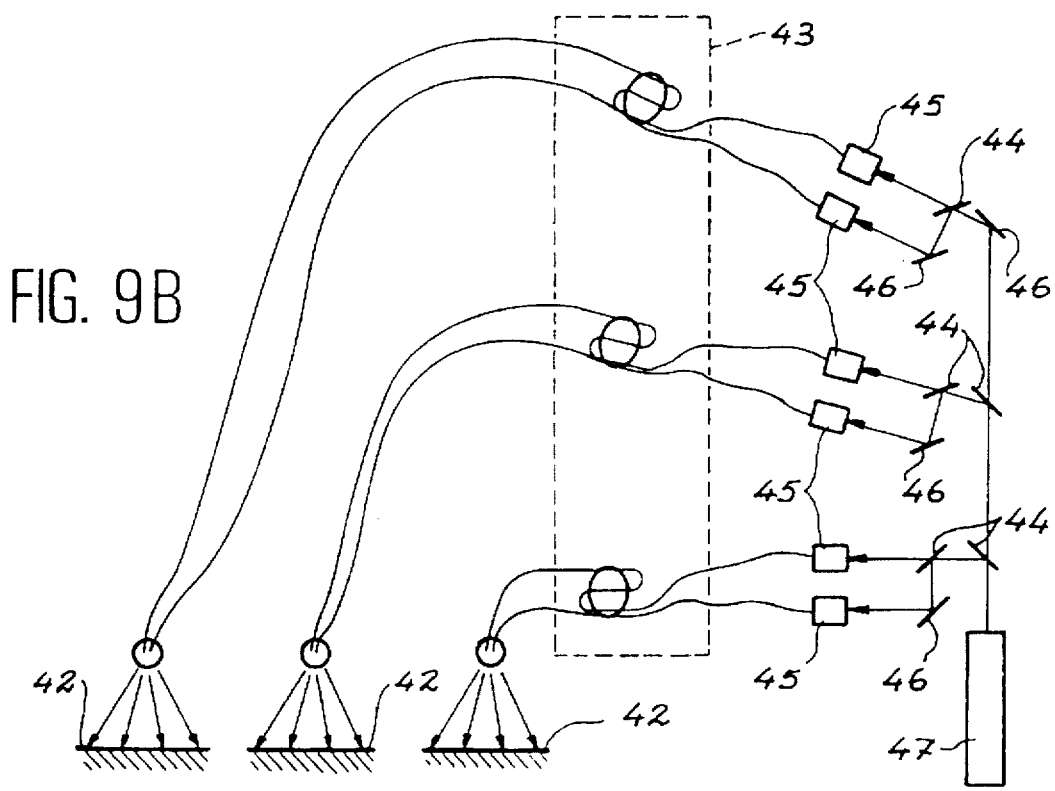
FIG. 9B illustrates a Mach-Zehnder interferometric rosette for measuring a longitudinal strain.

FIG. 9A illustrates a Mach-Zehnder interferometer gauge for measuring a longitudinal strain in accordance with Sirkis and Taylor, respectively the constitution and experimental arrangement. FIG. 9B illustrates a Mach-Zehnder interferometer rosette.

In FIG. 9A there is a measuring fibre 40 and a reference fibre 41 bonded in circular manner. In FIG. 9B there is a screen 42, a beam 43, a splitting plate 44, microscope objectives 45, mirrors 46 and a laser 47.

The intensity law and the processing of the Mach-Zehnder interferometer rosette signal are the same as for the Michelson interferometer rosettes to be described below.

Michelson interferometer rosette

This rosette and its construction are described in the publication by R. M. Measures entitled "Fiber Optic Fabry-Perot Strain Rosettes", Smart. Mater. Struct., vol. 1, 1992, pp 227–232. It is shown in FIG. 2B. The interferometry takes place between each optical measuring beam reflected in the three measuring arms with the reflected signal coming from the reference arm, not subject to the strains to be determined.

Figure 10:
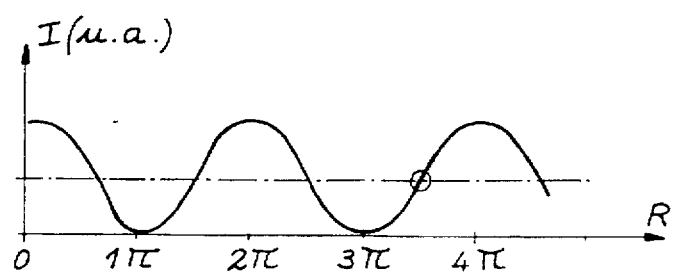
FIG. 10 illustrates a transfer function of the Michelson and Mach-Zehnder interferometers.

By design, the phase shift $\Delta\emptyset$ induced by the strains and temperature can be chosen small (below $\pi$), so that the evolution of the intensity takes place on the side of the transfer curve of the Michelson and Mach-Zehnder interferometer, as shown in FIG. 10 illustrating an intensity curve as a function of the optical delay R (phase shift) with a two-wave interferometer. For this, the length difference between the measuring arm and the reference arm must be a few mm to a few cm.

The Michelson and Mach-Zehnder interferometer conversion law is:

$$I_i = \frac{I_{oi}}{2} \cdot \left[ 1 + m_i \cdot \sin^2\left(\frac{\Delta\phi_i}{2}\right) \right] \qquad (11)$$

in which i=1 or 2 or 3 as a function of the interrogated measuring arm and m is the contrast (visibility) of the fringes, it being an experimental parameter (positive and below 1) dependent on the respective intensities of the reference beam and the measuring beam established during the construction of the rosette.

$I_i$ is the observed intensity which is a function of the phase shift $\Delta\emptyset_i$ (projected onto the screen in FIG. 9B) and $I_{oi}$ is the injected laser intensity. The observed intensity is directly converted into current by a measuring photodiode, whose current can be measured by a picoammeter or by an amplifier (phototransistor circuit), as described in the publication of Sirkis and Taylor.

The sensitivity of the gauges is at a maximum at a mid-height operating point (cf. FIG. 10). However, it is difficult to simultaneously adjust the operating point for the three gauges (by changing the wavelength), which gives rise to the need for a compromise.

Another solution employed by R. M. Measures (publication referred to hereinbefore) and J. S. Sirkis consists of counting the fringes if there is a significant optical path difference of about 1 meter or more. The problem is that counting only gives an absolute measurement and not a relative measurement, which implies that the sign of the strain is a priori known, which is rarely the case in practice.

A solution adopted by CSO in France then consists of splitting the measuring beam into two, one being observed directly and the other passing through an optical path corresponding to a quarter wave phase shift. Thus, two interference functions are observed in quadrature, which makes it possible to remove the uncertainty concerning the sign of the strain applied.

This solution was adopted by J. S. Sirkis, who placed two photodiodes close to one another on the screen onto which are projected Young slits. Thus, by observing the two signals slightly phase-displaced emitted by each of the two photodiodes, it is possible to determine the propagation direction of the fringes. The counter positively counts if the first detector is triggered on a fringe before the second and conversely the counter negatively counts if the second triggers before the first. For time coherence reasons, a single laser must be used in the two arrangements (Mach-Zehnder and Michelson).

Figure 11:
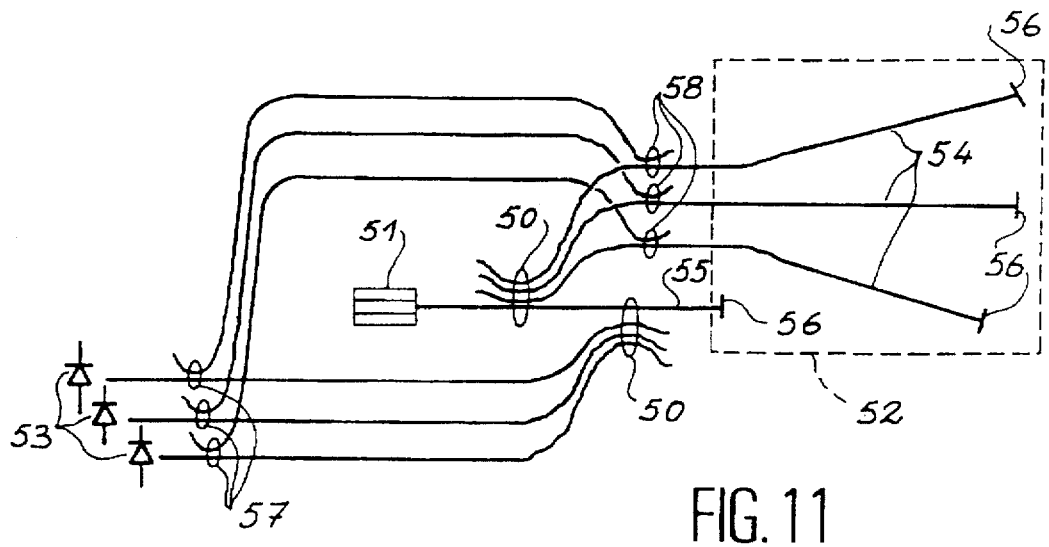
FIG. 11 illustrates a Michelson interferometer rosette.

The bringing into a network of several rosettes takes place by repeating the pattern shown in FIG. 11, placing several couplers 1×4 (50) in series, or by associating the same number of laser 51 as there are rosettes 52. It is also possible to see photodiodes 53, measuring fibres 54, a reference fibre 55, reflecting coatings (electrical multilayer) 56 and couplers 1×2 (57, 58). In the same way, the mirrors can be advantageously implemented by photo-inscribed Bragg networks of characteristic wavelengths covering the wavelength of the laser used.

Fabry-Perot interferometer rosette

This rosette is illustrated in FIG. 2C. Its design is described in the publication of R. M. Measures referred to hereinbefore. The interferometry takes place over the entire sensitive length of each gauge (i.e. between the semi-reflecting weld and the mirror at the end of the fibre).

Figure 12:
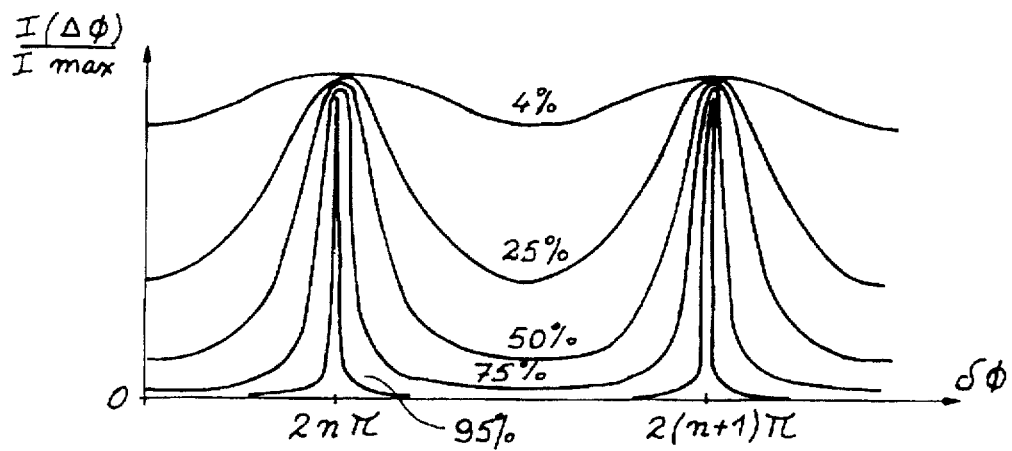
FIG. 12 illustrates typical transfer functions of a Fabry-Perot interferometer meter for several reflection coefficients.

The induced phase variation (by pressure, temperature or strains) produces an intensity variation transmitted in accordance with the known Airy function shown in FIG. 12. The latter illustrates typical transfer functions of a Fabry-Perot interferometer for several coefficients R=R1=R2:

$$\frac{I(\Delta\phi)}{I_0} = \frac{T_1 \cdot T_2}{[1-\sqrt{R_1 \cdot R_2}]^2 + 4\sqrt{R_1 \cdot R_2} \cdot \sin^2\left(\frac{\Delta\phi}{2}\right)} \quad (12)$$

in which $I_o$ is the incident intensity from the diode, $R_1$ and $R_2$ are reflection coefficients of the semi-reflecting weld and the dielectric layer, $T_1$ and $T_2$ are their respective transmissions, bearing in mind the losses by absorption $\gamma_1$ and $\gamma_2$, such that: $T_1+R_1+\gamma_1=1$ and $T_2$ and $R_2+\gamma_2=1$. The intensity observed in reflection corresponds to the intensity compliment $I_o$ of formula (12).

Figure 13:
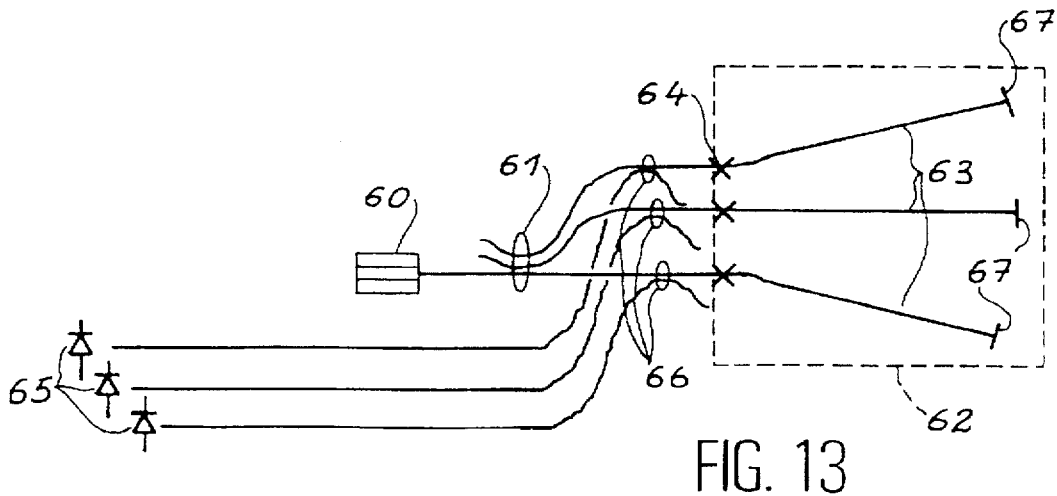
FIG. 13 illustrates a rosette with Fabry-Perot interferometers.

The optical connection is illustrated in FIG. 13 with an optical source (laser diode) 60, a coupler 1×3 (61), a rosette 62, measuring fibres 63, semi-reflecting welds 64, photodiodes 65 and optical couplers 1×2 (66).

In accordance with the two principles referred to hereinbefore (evolution of the intensity on the side of the response curve or fringe counting), the same detection principles as for Mach-Zehnder and Michelson interferometer rosettes can be applied.

What is claimed is:

1. Rosette-type, optical microsystem of strain gauges for measuring a strain applied to a part, said strain having a single component, said microsystem comprising: at least one rosette formed from at least two strain gauges positioned in series on a dielectric guide and a calculating circuit for determining said strain, independently of temperature, by resolution of a system of equations.

2. Optical microsystem according to claim 1, characterized in that the strain gauges are photo-inscribed Bragg networks ($RB_1$, $RB_2$, $RB_3$).

3. Optical microsystem according to claim 2, characterized in that the rosette is formed from three Bragg networks ($RB_1$, $RB_2$, $RB_3$).

4. Optical microsystem according to claim 3, characterized in that the Bragg networks are positioned at 120° from one another.

5. Optical microsystem according to claim 3, characterized in that the three networks are simultaneously inscribed by the same optical irradiation beam.

6. Optical microsystem according to claim 3, characterized in that the three networks are not simultaneously inscribed and can have different characteristic wavelengths.

7. Optical microsystem according to claim 3, characterized in that the system of equations is as follows:

$$\begin{cases} \lambda_1 - \lambda_1^0 = \xi_1 \cdot [d + r \cdot \cos(2 \cdot \alpha)] + \xi_2 \cdot (T - T_0) \\ \lambda_2 - \lambda_2^0 = \xi_1 \cdot [d + r \cdot \cos(2 \cdot \alpha - 2 \cdot \beta_2)] + \xi_2 \cdot (T - T_0) \\ \lambda_3 - \lambda_3^0 = \xi_1 \cdot [d + r \cdot \cos(2 \cdot \alpha + 2 \cdot \beta_1)] + \xi_2 \cdot (T - T_0) \end{cases}$$

$\lambda_1$, $\lambda_2$ and $\lambda_3$ being the respective characteristic wavelengths of the three Bragg networks constituting the rosette, said wavelengths being very close to one another and $\lambda_1^o$, $\lambda_2^o$ and $\lambda_3^o$ are the characteristic wavelengths in the absence of deformations and at a reference temperature $T_o$, $\xi_1$ being a coefficient linking the characteristic wavelength with the deformation and $\xi_2$ a thermal expansion coefficient, the two angles $\beta_1$ and $\beta_2$ being of a random nature, but known and non-zero modulo, characterizing the rosette and $\alpha$ being the angle formed by the orientation of the strain to be determined with the orientation of a reference strain gauge of the rosette, the parameters d and r being respectively the half-sum and half-difference of the deformations to be determined.

8. Optical microsystem according to claim 1, characterized in that it comprises at least one dielectric guide, regardless of polarization maintenance, in which are incorporated the strain gauges.

9. Optical microsystem according to claim 8, characterized in that the gauges are surface-bonded to a locally planar support material, whose deformations are to be determined.

10. Optical microsystem according to claim 8, characterized in that the gauges are Bragg networks, which function by the phase tuning effect, and in that the guides are monomode and photosensitive.

11. Optical microsystem according to claim 8, characterized in that the gauges function by an interferometric effect and in that the guides are monomode.

12. Optical microsystem according to claim 1, characterized in that each strain gauge measures an optical path variation, which is a function of the strain to be measured and which induces a spectral displacement.

13. Optical microsystem according to claim 1, characterized in that each strain gauge measures an optical path variation, which is a function of the strain to be measured and which induces a displacement of the interference fringes.

14. Optical microsystem according to claim 1, characterized in that said microsystem has a configuration of a balanced Sagnac interferometer using a 50% reflection coupler in the spectral band of use, said configuration being constituted by a single guide plane and permitting the inclusion of a rosette between two planes of a material.

15. Optical microsystem according to claim 3, characterized in that the Bragg networks are positioned 45° from one another.

16. Optical microsystem according to claim 3, characterized in that the three networks are successively inscribed by the same optical irradiation beam.

17. Optical microsystem according to claim 9, characterized in that the gauges are embedded within a locally planar support material, whose deformations are to be determined.

18. Optical microsystem according to claim 1, characterized in that the gauges are oriented in a non-parallel, non-collinear arrangement.

19. Optical microsystem according to any one of claims 1–7, or 17–18, characterized in that the dielectric guides are optical fibres.

* * * * *

UNITED STATES PATENT AND TRADEMARK OFFICE
CERTIFICATE OF CORRECTION

PATENT NO. : 5,726,744
DATED : March 10, 1998
INVENTOR(S) : Ferdinand et al.

It is certified that error appears in the above-identified patent and that said Letters Patent is hereby corrected as shown below:

In the drawings, for Fig. 2A, Fig. 2B, and Fig. 2C, insert in legend --Prior Art--.

Column 4, line 45, delete "meter".

Column 4, line 63, equation (1) should read:
   --$\lambda_r = 2 \cdot N \cdot \Lambda$--.

Column 4, line 66, delete "and $\lambda$", and insert --and $\Lambda$--.

Column 7, line 33, delete "(which is dependent on $\lambda$" and insert --(which is dependent on $\lambda$)--.

Column 8, line 62, equation (7), delete the Plus sign (+) (last occurence) and insert therefor a minus sign (-).

Column 10, line 2, delete "FIG. 5G" and insert --FIG. 5C--.

Column 11, line 14, delete "add" and insert --and--.

Column 13, line 5, equation (10) should read as follows:
   $\Delta\phi/L = x_t \cdot dT + x_\epsilon \cdot d\epsilon + _p \cdot dP$.

UNITED STATES PATENT AND TRADEMARK OFFICE
CERTIFICATE OF CORRECTION

PATENT NO. : 5,726,744
DATED : March 10, 1998
INVENTOR(S) : Ferdinand et al.

It is certified that error appears in the above-identified patent and that said Letters Patent is hereby corrected as shown below:

Column 15, line 23, delete "$R_2+\gamma=1.$" and insert --$R_2+\gamma_2=1.$--.

Column 15, line 49, delete "at".

Column 16, line 55, delete "claim 9" and insert --claim 8--.

Signed and Sealed this

Twenty-second Day of September, 1998

Attest:

BRUCE LEHMAN

*Attesting Officer*     Commissioner of Patents and Trademarks